United States Patent
Kumar et al.

(10) Patent No.: US 10,187,477 B2
(45) Date of Patent: Jan. 22, 2019

(54) RESTFUL INTERFACE SYSTEM FOR AN APPLICATION

(71) Applicant: Microsoft Technology Licensing, LLC, Redmond, WA (US)

(72) Inventors: Abhishek Kumar, New Delhi (IN); Anand Ramagopalrao, Hyderabad (IN); Sagar Jagdish Hotchandani, Bibvewadi (IN); Ravi Kant Pandey, Hyderabad (IN); Lavanya Kappagantu, Hyderabad (IN); Christopher Adam Brooks, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 15/256,092

(22) Filed: Sep. 2, 2016

(65) Prior Publication Data
US 2018/0069931 A1    Mar. 8, 2018

(51) Int. Cl.
*H04L 29/08* (2006.01)

(52) U.S. Cl.
CPC ............ *H04L 67/141* (2013.01); *H04L 67/02* (2013.01)

(58) Field of Classification Search
None
See application file for complete search history.

(56) References Cited

U.S. PATENT DOCUMENTS

| 8,984,046 B2 | 3/2015 | Dhoolia et al. |
| 2013/0046894 A1 | 2/2013 | Said et al. |
| 2014/0101199 A1 | 4/2014 | Nun et al. |
| 2014/0279060 A1 | 9/2014 | Memarian et al. |
| 2014/0344709 A1 | 11/2014 | Roberts et al. |
| 2015/0227406 A1* | 8/2015 | Jan ................ G06F 11/079 714/37 |
| 2016/0291993 A1* | 10/2016 | Prabhakar ........ G06F 9/45529 |

OTHER PUBLICATIONS

Dambal, Vedesh, "REST, Web services, REST-ful services," Published on: Jun. 14, 2010 Available at: http://www.ibm.com/developerworks/library/ws-RESTservices/.
Mahowald, et al., "Salesforce1 Platform: Accelerate App Dev with Huge ROI," In White Paper of IDC, Feb. 2014, 31 pages.

(Continued)

*Primary Examiner* — Natisha D Cox
(74) *Attorney, Agent, or Firm* — Ray Quinney & Nebeker P.C.; Paul N. Taylor

(57) ABSTRACT

An endpoint system provides a REST endpoint for an application. The endpoint system processes request messages based on message pair data for each message that includes an operation and parameter data. The parameter data includes parameter information for each parameter that identifies whether the value for the parameter is to be taken from the URI or payload of a request message. The endpoint system receives request messages that have a URI and payload. The URI includes an operation name. The endpoint system processes each request message in accordance with the message pair data for the operation specified in the request message. For each parameter of the message pair data, the endpoint system extracts the value for the parameter from the URI, payload, headers, or query parameters as specified by the parameter information. The endpoint system invokes the operation passing the one or more extracted values as actual parameters.

18 Claims, 4 Drawing Sheets

(56) References Cited

OTHER PUBLICATIONS

Bageri, Saineshwar, "How to Create Web API in ASP.Net MVC," Published on: Nov. 24, 2014 Available at: http://www.c-sharpcorner.com/UploadFile/4d9083/how-to-create-web-api-in-Asp-Net-mvc/.

Mertic, John, "Being RESTful with SugarCRM," Published on: Jan. 12, 2010 Available at: http://www.ibm.com/developerworks/library/x-sugarcrmrest/.

"Oracle CRM on Demand REST API Developer's Guide," Published on: Oct. 2014 Available at: https://docs.oracle.com/cd/E56321_01/books/PDF/RestAPI.pdf.

Bobrowski, Steve, "The Force.com Multitenant Architecture," Published on: Mar. 22, 2015 Available at: https://developer.salesforce.com/page/Multi_Tenant_Architecture.

Ganz, et al., "End-to-End How-to Guide: Building SAPUI5 Applications on SAP NetWeaver AS ABAP 7.31 Consuming Gateway OData Services," Published on: Nov. 29, 2012 Available at: http://docslide.us/documents/end-to-end-how-to-guide-building-sapui5-applications-on-sap-netweaver-as-abap.html.

"Zoho Creator REST API," Published on: Feb. 20, 2013 Available at: https://www.zoho.com/creator/help/api/rest-api/zoho-creator-rest-api.html.

Alarcón, et al., "RESTler: Crawling RESTful Services," In Proceedings of World Wide Web Conference, Apr. 26, 2010, pp. 1051-1052.

"Sample: Create, Retrieve, Update, and Delete Using the OData Endpoint with Javascript," Retrieved on: Nov. 16, 2015 Available at: https://msdn.microsoft.com/en-us/library/gg334427.aspx.

"Perform Basic Data Operations Using the Odata Endpoint," Retrieved on: Nov. 16, 2015 Available at: https://msdn.microsoft.com/en-us/library/gg328090.aspx.

"Supported Messages and Entities for Plug-Ins," Retrieved on: Nov. 16, 2015 Available at: https://msdn.microsoft.com/en-us/library/gg328576.aspx.

"Microsoft Dynamics CRM Web API Preview," Retrieved on: Nov. 16, 2015 Available at: https://msdn.microsoft.com/en-us/dynamics/crm/webapipreview.aspx.

* cited by examiner

RESTFUL INTERFACE SYSTEM FOR AN APPLICATION

BACKGROUND

Many applications, such as a customer relationship management ("CRM") application or enterprise resource planning ("ERP") application, provide a standard set of entity types with each entity type having attributes to model and manage business data. For example, a CRM application may have a standard set of entity types such as an account, a customer, and a campaign, and the account entity type may have attributes such as name and address. A data model specifies metadata that defines the entity types and attributes for the entity types for the business data. These applications may also allow users to modify the data model, for example, by defining new entity types and new attributes. For example, a user may define an entity type such as a college that has attributes that include a name and a public/private flag. Each entity type is represented as a "metadata entity" in the data model for the application and has an entity name. For example, a CRM application may have a metadata entity for each account, customer, and campaign with the names of "account," "customer," and "campaign." These applications also allow system administrators or system customizers to create "entity records," which are instances of entity types, to store the data of the applications as the values of the attributes of the entity type. For example, a user may create an entity of the customer entity type for each customer. These applications also allow users to define actions to modify data and functions to access data. For example, a user may define an action to add an entity that is a list ("list entity") to an entity that is a campaign ("campaign entity").

These applications may also support a client/server model in which the application is hosted on a server that interfaces with client code that runs on user devices (e.g., desktops or smart phones). These applications may allow the clients to access the server using an interface that supports the Simple Object Access Protocol ("SOAP"). SOAP is a protocol specification for exchanging structure information for web services, typically via the Hypertext Transfer Protocol ("HTTP"). A SOAP message consists of an envelope, a header, and a body. These applications typically use a request/response model to allow clients to access the services of the application by invoking operations. A request sent from a client to the server specifies the requested service, such as create a new metadata entity corresponding to a new entity type, create a new entity of a certain entity type, or perform a user-defined operation (i.e., action or function). The request also specifies parameters for the request, such as the attributes of the metadata entity to create, the entity type of the entity to create and the values of its attributes, and the parameters for an action. A response to a request is sent from the server to the requesting client and includes responsive data. For example, the responsive data for a request to create an entity may be a globally unique identifier ("GUID") for the entity. After receiving the response, the client can then send a request that includes the GUID to modify an attribute of the entity. A request message and the response message are referred to as a message pair. These applications, of course, need to understand and process the message pairs.

Although a separate code could be specifically developed to handle each message pair (e.g., extracting operation name and parameter values), an application may instead store information, referred to as "message pair data," defining each message pair and using common code to process message pairs. The message pair data includes parameter information for each parameter that identifies the name of the parameter and its type (e.g., string or GUID). When a request message is received, the common code extracts the operation name from the message, retrieves the message pair data for that operation name, and then for each parameter, extracts the data for that parameter from the message and creates an actual parameter of the specified type that is initialized based on the extracted value. The common code then invokes the operation passing the actual parameters.

The following is an example of the signature for a service named "AddItemCampaign," which adds an item (e.g., a list entity or product entity) to the campaign:

AddItemCampaign(GUID CampaignId, Guid EntityId, string EntityName)

The information defining the message pair for this service may be represented using eXtensible Markup Language ("XML") data as follows:

```
<SdkMessagePair>
    <Endpoint>soap</Endpoint>
    <SdkMessageRequest>
        <Name>AddItemCampaign</Name>
        <Fields>
            <Field>
                <Name>CampaignId</Name>
                <ClrParser>System.Guid</ClrParser>
            </Field>
            <Field>
                <Name>EntityId</Name>
                <ClrParser>System.Guid</ClrParser>
            </Field>
            <Field>
                <Name>EntityName</Name>
                <ClrParser>System.String</ClrParser>
            </Field>
        </Fields>
    </SdkMessageRequest>
    <SdkMessageResponse>
    ...
</SdkMessagePair>
```

The XML data includes a <field> tag for each parameter that specifies the name of each parameter (e.g., "EntityId") and its type (e.g., System.Guid). When a message is received that specifies the AddItemCampaign operation, the server retrieves this XML data, creates the actual parameters, and invokes the AddItemCampaign operation passing the actual parameters. Although not illustrated, the XML data includes information defining the response message so that the server can send a response message with the data defined for the AddItemCampaign operation.

As discussed above, these applications provide services that allow users to define new message pairs. For example, when a user wants to define a new operation, the user installs on the server the code for the operation and a new message pair for that operation. A client can then send request messages for the new operation, and the application will use the new message pair for that operation to extract parameters and invoke the new code.

Although the usage of SOAP has been both wide spread and successful, a newer and improved protocol, referred to as the Open Data Protocol ("OData"), is being rapidly adopted by the computing industry. OData employs a Representational State Transfer ("REST") model. A system that conforms with the REST model is said to be "RESTful." The REST model uses the same HTTP verbs (e.g., POST and GET) as used by web browsers. For example, an OData request to retrieve a collection of people may be represented as follows:

GET serviceroot/People

The "GET" is the HTTP verb, and "serviceroot/People" is a Uniform Resource Identifier ("URI"). The "serviceroot" is the URI of the server, and "People" is a resource identifier that identifies a collection of people of the server. Upon receiving the request, the server retrieves all people entities and sends to the client the data of the people entities as the payload of the response message.

As another example, an OData request to retrieve a single instance of people may be represented as follows:

GET serviceroot/People('johndoe')

The "johndoe" represents the resource identifier of the people entity to be retrieved. Both request messages and response messages can have payloads. The payloads may be specified using JavaScript Object Notation ("JSON").

As another example, an OData message to perform an AddItemToVehicle operation on the people entity may be represented as follows:

GET serviceroot/People('johndoe')/AddItemToVehicle.

The payload for the OData message may include the identifier of the vehicle. In this example, the operation AddItemToVehicle is said to be bound to the entity identified by "johndoe." An OData request message may also include a query option for identifying entities that match a query.

SUMMARY

In some embodiments, an endpoint system provides a REST endpoint for an application. The endpoint system processes request messages based on message pair data for each message that includes an operation and parameter data. The parameter data includes parameter information for each parameter that identifies whether the value for the parameter is to be taken from the URI or payload of a request message. The endpoint system receives request messages that have a URI and payload. The URI includes an operation name (or message name). The endpoint system processes each request message in accordance with the message pair data for the operation specified in the request message. For each parameter of the message pair data, the endpoint system extracts the value for the parameter from either the URI or payload as specified by the parameter information for the parameter. The endpoint system then invokes the operation passing the one or more extracted values as actual parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
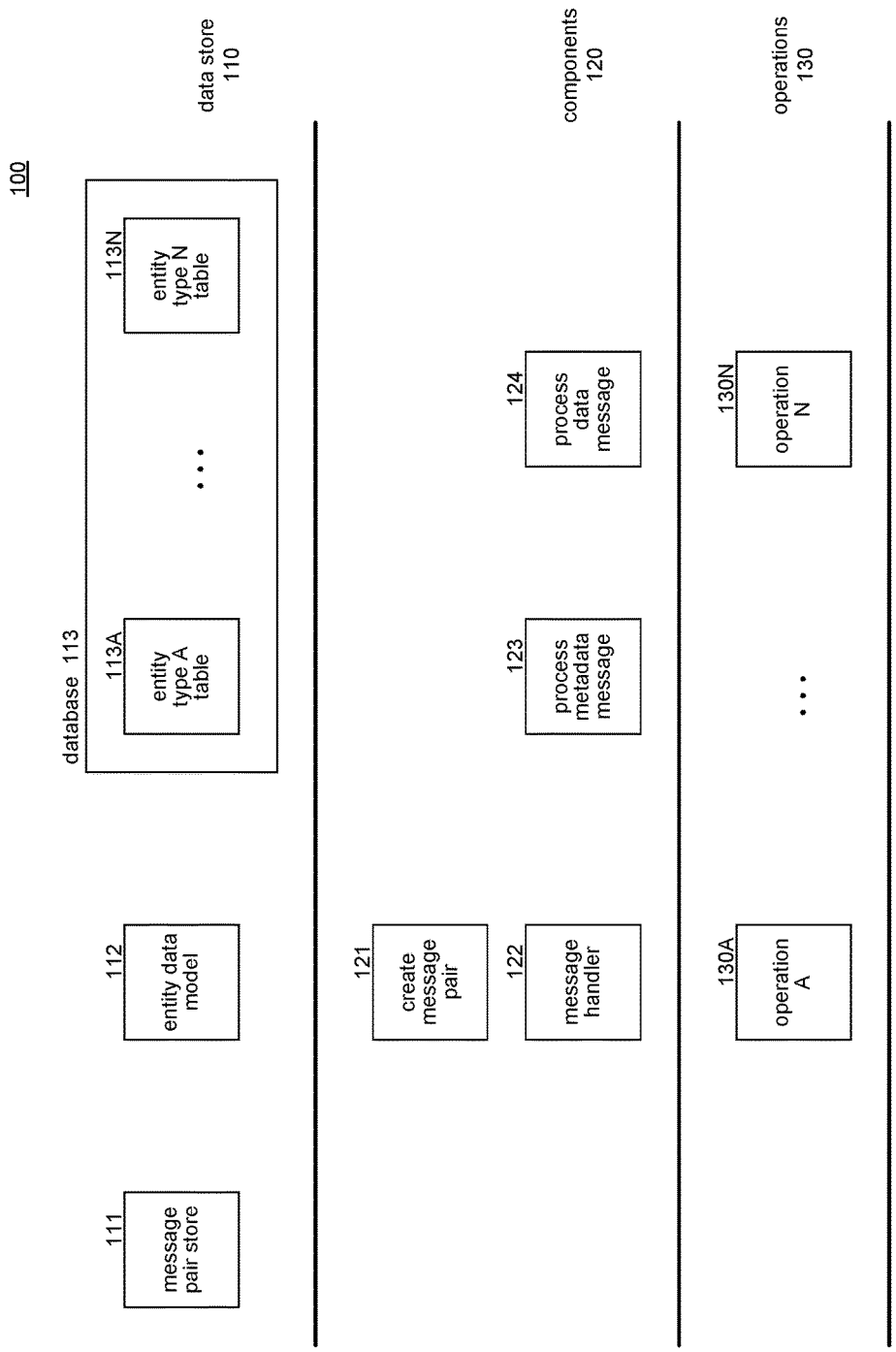
FIG. 1 is a block diagram illustrating aspects of an endpoint system in some embodiments.

A method and system for providing a REST endpoint, providing a REST interface as an application programming interface ("API") for an application is provided. In some embodiments, an endpoint system generates message pair data for messages supported by the endpoint system. The message pair data, like the message pair data for a SOAP endpoint, includes the name of the operation and parameter data. However, unlike the messages for a SOAP endpoint, some of the values for the parameters are included in the URI of a REST message, rather than in its payload. The operation of the message is referred to as being bound to the parameter specified in the URI. To indicate which parameters the operation is bound to, the endpoint system includes a parameter binding information tag (e.g., <ParameterBindingInformation>) in the field tag for the parameters to which the operation is bound. For example, an operation to add an item (e.g., a person, an animal, or product) to a vehicle may be represented as follows:

Add ItemToVehicle(Guid Vehicle, Guid EntityId, String EntityName)

where EntityId is the identifier of the item to add and EntityName is the entity type of the item to add. To support the REST interface, the endpoint system exposes the operation as follows:

item.AddItemToVehicle(Vehicle Vehicle).

This means that the AddItemToVehicle operation is bound to the item that is specified in the URI of the request message. The request message may be represented as follows:

POST serviceroot/People('BG09B')/AddItemToVehicle

The AddItemToVehicle operation is bound to the entity name of "People" and to the entity identifier (e.g., GUID), which may uniquely identify the people entity "johndoe." The message pair data for the AddItemToVehicle operation may include a parameter binding information tag for both the EntityId and EntityName parameters to indicate that the operation is bound to those parameters. The parameter information for the Vehicle parameter does not include a binding information tag, indicating that the operation is not bound to it and that the parameter value is to be extracted from the payload.

In some embodiments, when the endpoint system receives a message, the endpoint system extracts the operation name from the message. For example, the endpoint system extracts "AddItemToVehicle." The endpoint system then retrieves the message pair data for the AddItemToVehicle operation. The endpoint system retrieves the value for each parameter as specified by the field tags of the message pair data. When the parameter information for the parameter includes parameter binding information, the endpoint system retrieves a value for the parameter from the URI. For example, since the parameter information for the EntityId and EntityName parameter includes the parameter binding information tag, the endpoint system extracts "People" as the value for the EntityName parameter and "BG09B" as the value for the EntityId parameter. When the parameter information for the parameter does not include parameter binding information, the endpoint system retrieves a value for the parameter from the payload. For example, since the parameter information for the Vehicle parameter does not include a parameter binding tag, the endpoint system extracts the vehicle identifier from the payload, which may be specified using a JSON format. The endpoint system then invokes the operation passing the extracted parameters.

In some embodiments, the endpoint system allows the message pair data to specify the entity types to which the operation can be bound. For example, the AddItemToVehicle operation can be bound to an entity that is a person, an animal, or a product entity type. To indicate the entity types, the message pair data includes a message binding tag (e.g., "<MessageBindingInformation>") that lists the entity type to which the operation can be bound. When a request message is received, the endpoint system ensures that the entity type specified in the URI matches one of the entity types specified by the message binding information tag. If it does not, the endpoint system sends a response message that indicates an error.

In some embodiments, the endpoint system supports accessing of metadata underlying the data model. The accessing includes creating, reading, updating, and deleting of the metadata, which are referred as "CRUD" operations. For example, the name of the operation to create a new entity type may be "CreateEntity," and the name of the operation to retrieve the data of metadata entity may be "GetEntity." Rather than specifying the operation name in the request message, the endpoint system uses the HTTP verbs to represent the request operation. For example, a request message to create an entity may specify the POST verb and the URI may specify the metadata type to be created, such as Entity or Attribute. The request message may be represented as follows:

POST api/data/Entity

The payload for the request message specifies the attributes (e.g., an address field and a name) for the new entity type. The message pair data for the CRUD operation on metadata includes message binding information that indicates that the operation is on metadata, the metadata type, and the specific HTTP verb. For example, the message binding information for the create entity operation may have a flag indicating that the operation is on metadata and indications of Entity and POST. An update metadata operation may also be specified using the POST verb. In such a case, the endpoint system may distinguish a create metadata request from an update metadata request by the absence or presence of the key for a specific metadata entity in the URI. The endpoint system may use the GET verb to represent a retrieve request and the DELETE verb to represent a delete request. In some embodiments, each entity type may derive from a base entity type (e.g., CrmbaseEntity), which is abstract. As described below, the deriving from the base entity type allows all instances of entities to be identified by a reference to their base entity.

As another example, a request message to add an item to a campaign may be represented as follows:

api/data/list(4d59)/AddItemCampaign
{

```
'Campaign':{'campaignid':'2349'}
}
```

The "api/data" identifies the REST endpoint, "list" identifies that the item to be added as the entity type of list, the "4d59" is the identifier of a list entity, and "AddItemCampaign" is the name of the operation. The payload of the message, which is in the JSON format, specifies the identifier "2349" of the campaign entity to which the list entity is to be added.

To support the processing of messages for a REST endpoint, the endpoint system generates new message pair data for each existing message pair (e.g., SOAP message pairs) that is to be used for the REST endpoint. Each new message pair data includes an <endpoint> tag to indicate that the new message pair data is for the REST endpoint as follows:

<Endpoint>api/data</Endpoint>.

The new message pair data may also include a <MessageBindingInformation> tag and a <ParameterBindingInformation> tag. The <MessageBindingInformation> tag specifies the possible entity types of the parameter to which the operation may be bound. For example, if the AddItemCampaign operation can be used to add a list entity, a campaign entity, or a product entity, then the tag may be represented as follows:

<MessageBindingInformation>list,campaign,product</MessageBindingInformation>

When a request that specifies the AddItemCampaign operation is sent to the REST endpoint, the endpoint system ensures that the entity type specified in the URI is a list, a campaign, or a product based on the <MessageBindingInformation> tag in the message pair data for the AddItemCampaign operation.

The <ParameterBindingInformation> tag specifies the parameters of the URI to which the operation is bound. For example, the EntityId parameter and the EntityName parameter of the URI are bound to the AddItemCampaign operation. A <ParameterBindingInformation> tag may be added to the <Field> tag for each of these parameters to indicate that the value of the parameter is in the URI and the parameter is bound to the operation as follows:

<ParameterBindingInformation>Bound:TRUE</ParameterBindingInformation>.

The message pair data for the AddItemCampaign operation may be represented as follows:

```
<MessagePair>
    <Endpoint>api/data</Endpoint>
    <MessageBindingInformation>list,campaign,product</MessageBindingInformatio
n>
    <MessageRequest>
        <Name>AddItemCampaign</Name>
        <Fields>
            <Field>
                <Name>CampaignId</Name>
                <ClrParser>System.Guid</ClrParser>
            </Field>
            <Field>
                <Name>EntityId</Name>
                <ClrParser>System.Guid</ClrParser>
    <ParameterBindingInformation>Bound:TRUE</ParameterBindingInformation>
            </Field>
            <Field>
                <Name>EntityName</Name>
                <ClrParser>System.String</ClrParser>
    <ParameterBindingInformation>Bound:TRUE</ParameterBindingInformation>
            </Field>
        </Fields>
```

```
    </MessageRequest>
    <MessageResponse>
...
</MessagePair>
```

As discussed above, in some embodiments, the endpoint system represents CRUD operations on the metadata of the data model (e.g., create a metadata entity for an entity type or an attribute) using the HTTP verbs, rather than representing the operation ("CreateEntity") in the URI itself. These operations on the metadata are referred to as primitive operations. For example, the request to create a new entity type of "Bank" may be represented as follows:

```
POST api/data/Entity
{
    "EntityName":"Bank"
...
}
```

The "POST" indicates create, and "Entity" indicates that a new entity type is to be created. The new message pair data for the create entity operation includes a <MessageBindingInformation> tag that specifies that the operation is specified by a primitive operation, the primitive operation, and the entity type. For example, the <MessageBindingInformation> tag for the message pair data for the create entity operation may be represented as follows:

```
<MessageBindingInformation>
    Primitive:TRUE,MetadataName:Entity,PrimitiveOperationMethod:POST
</MessageBindingInformation>.
```

The "PrimitiveOperationMethod:POST" indicates that the service is bound to the primitive method of POST.

The syntax for the various forms of the <MessageBindingInformation> tag may be represented as one of the following forms:
 1. Primitive:True,
    MetadataName: <MetadataEntityName>,
    PrimitiveOperationMethod:<HttpMethod>|
 2. Entity:Bound/<OTCs>|
 3 EntitySet:Bound/<OTCs>.

The first form is for messages that are primitive operations. "Primitive:True" means this operation is a primitive operation on a metadata entity. The "<MetadataName>" can be
    Entity|Attribute|EntityKey|CrmbaseEntity
where all the entities derive from CrmbaseEntity. The "<HttpMethod>" can be
    POST|PATCH|GET|DELETE which are mapped respectively to:
    CREATE|UPDATE|RETRIEVE|DELETE The second form is for messages that perform operations on an entity such as a list entity or a campaign entity. The second form represents the entity types to which operation of the message can be bound. "Entity:Bound" represents that the operation is bound to a primary entity type specified for the operation. "Entity:<OTCs>" represents that the operation can be bound to any of the enumerated entity types, which may be represented by object type codes ("OTCs").

The third form is similar to the second form except that the operation is bound to an entity set, rather than a single entity.

The syntax for the various options of the <ParameterBindingInformation> tag may be represented as follows:
    Bound:TRUE|OTC:OTC|AsEntityParameter: <ParameterName>

The first option "BOUND:TRUE" is to indicate that the operation is bound to the parameter with a value taken from the URI. The parameters from the resource identifier of the URI to which an operation can be bound include a reference to an entity (e.g., EntityReference), a reference to an array of entities, a GUID, an array of GUIDs, a string, and a reference to a collection of entity references (e.g., "EntityReferenceCollection"). The parameters from the query option to which an operation can be bound include a query base (e.g., "QueryBase"), a query expression (e.g., "QueryExpression"), and a set of columns (e.g., "ColumnSet"). If the <MessageBindingInformation> tag indicates that the operation is bound to a single entity (e.g., "Entity:Bound"), then exactly one <Field> tag of the message pair data can include the <ParameterBindingInformation> tag. Also, at most one <Field> tag of the message pair for a query parameter can include the <ParameterBindingInformation> tag.

OData does not support complex types needed to support query expression ("QueryExpression") and query base ("QueryBase") parameters. The endpoint system allows a parameter that is a query to be bound to the query options of a URI. For example, a URI to retrieve accounts may be represented as follows:
    api/data/accounts?$filter=name eq 'somevalue'&$select=name.

The column set ("ColumnSet") for a query is exposed as the "$select" of the query option.

The binding system allows query parameters for the OData endpoint only for composable functions. A composable function has the following characteristics:
 1. The message is read-only.
 2. The message has only one return type parameter Collection<CrmbaseEntity>for QueryExpression and Collection<CrmbaseEntity>or CrmbaseEntity for ColumnSet.
 3. The message has only one input parameter of QueryExpression, QueryBase or ColumnSet A request message may be represented as follows:
    OData/data/RetrieveByGroupResource(ResourceId)?
    $filter=name eq 'somevalue'&$select=name The corresponding message pair data may be represented as follows:

```
<MessagePair>
    <Endpoint>OData</Endpoint>
    <MessageBindingInformation>list,campaign,product</MessageBindingInformatio
n>
    <MessageRequest>
        <Name>RetrieveByGroupResource</Name>
        <Fields>
            <Field>
                <Name>ResourceGroupId</Name>
                <ClrParser>System.Guid</ClrParser>
            </Field>
            <Field>
                <Name>Query</Name>
                <ClrParser>QueryBase</ClrParser>
    <ParameterBindingInformation>Bound:TRUE</ParameterBindingInformation>
            </Field>
            <
        </Fields>
    </MessageRequest>
    <MessageResponse>
...
</MessagePair>
```

The second option is for a parameter that is strongly typed. The types of parameters to which an operation can be bound are a reference to an entity (e.g., EntityReference), a reference to an array of entities, a GUID, an array of GUIDs, and a reference to a collection of entity references (e.g., "EntityReferenceCollection"). For example, "OTC:4400" indicates that the parameter is a reference to a 'list' entity assuming 4400 is the object type code for the list entity.

The third option supports the combining of an entity identifier (Guid) parameter and an entity name (string) parameter so that they can be exposed as one OData parameter. The AsEntityParameter indicates which parameter of the URI the message parameter is bound to. For example, if the operation has the following signature:

FIG. 1 is a block diagram illustrating aspects of an endpoint system in some embodiments. An endpoint system 100 includes a data store 110, components 120, and operations 130. The data store stores the data of the endpoint system in a message pair store 111, an entity data model 112, and a database 113. The message pair store includes an entry for each message pair that includes the message pair data for that message pair. In some embodiments, the endpoint system may preprocess the message pair data that is in the XML format and store the message pair data in a form for more efficient processing at runtime. The entity data model stores the metadata of the database, including the definition of the entity types and attributes. The database includes entity type tables 113A-113N that store the data of the application that the endpoint system makes available to the

```
Guid AddItemCampaignActivity(Guid CampaignActivityId, Guid ItemId, string
EntityName)
The binding system exposes the operation as
Guid AddItemCampaignActivity(CampaignActivity CampaignActivity, CrmBaseEntity
Item)
<MessagePair>
    <Endpoint>api/data</Endpoint>
    <MessageRequest>
        <Name> AddItemCampaignActivity_</Name>
        <Fields>
            <Field>
                <Name>CampaignActivityId</Name>
                <ClrParser>System.Guid</ClrParser>
                <ParameterBindingInformation>
                    OTC:4402,AsEntityParameter:CampaignActivity
                </ParameterBindingInformation>
            </Field>
            <Field>
                <Name>ItemId</Name>
                <ClrParser> System.Guid </ClrParser>
                <ParameterBindingInformation> AsEntityParameter:Item
</ParameterBindingInformation>
            </Field>
            <Field>
                <Name>EntityName</Name>
                <ClrParser>System.String</ClrParser>
    <ParameterBindingInformation>AsEntityParameter:Item</ParameterBindingInfor
mation>
            </Field>
        </Fields>
    </MessageRequest>
    <MessageResponse>
...
</MessagePair>
``` clients. The components include a create message pair component 121, a message handler component 122, a process metadata message component 123, and a process data message component 124. The create message pair component facilitates the creating of new message pair data for a message for the REST endpoint based on existing message pair data for the message. The message handler component receives messages from clients, parses the messages, and invokes the process metadata component to handle messages that access the metadata message and the process data component to handle messages that access the database. The operations include operations 130A-N that each implement the functionality of a message. The operations may be predefined by the application or may be defined by users as customization to the application.

In some embodiments, the endpoint system may generate a service document and metadata document as specified by the OData protocol. The service document lists the entity sets, functions, and singletons that can be retrieved, and the metadata document describes the types, sets, functions, and actions understood by the REST endpoint. The service document and the metadata document can be generated from the message pair data and the metadata of the endpoint system. The endpoint system can advertise the service document and the metadata document to clients.

The computing systems on which the endpoint system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the endpoint system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The endpoint system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the endpoint system may be implemented in hardware using, for example, an application-specific integrated circuit (ASIC).

In some embodiments, the endpoint system may preprocess the message pair data and generate a mapping to facilitate retrieval of the message pair data given a request message. The endpoint system may also generate a message-specific function for each message that implements the extracting of the parameters and invoking of the operation as specified by the message pair data. For example, the endpoint system may generate a function that includes code to extract the values from the URI for parameters with parameter binding information and values from the payload for the other parameters as specified by the message pair data. The function also includes code that invokes the operation passing the extracted values as actual parameters.

Figure 2:
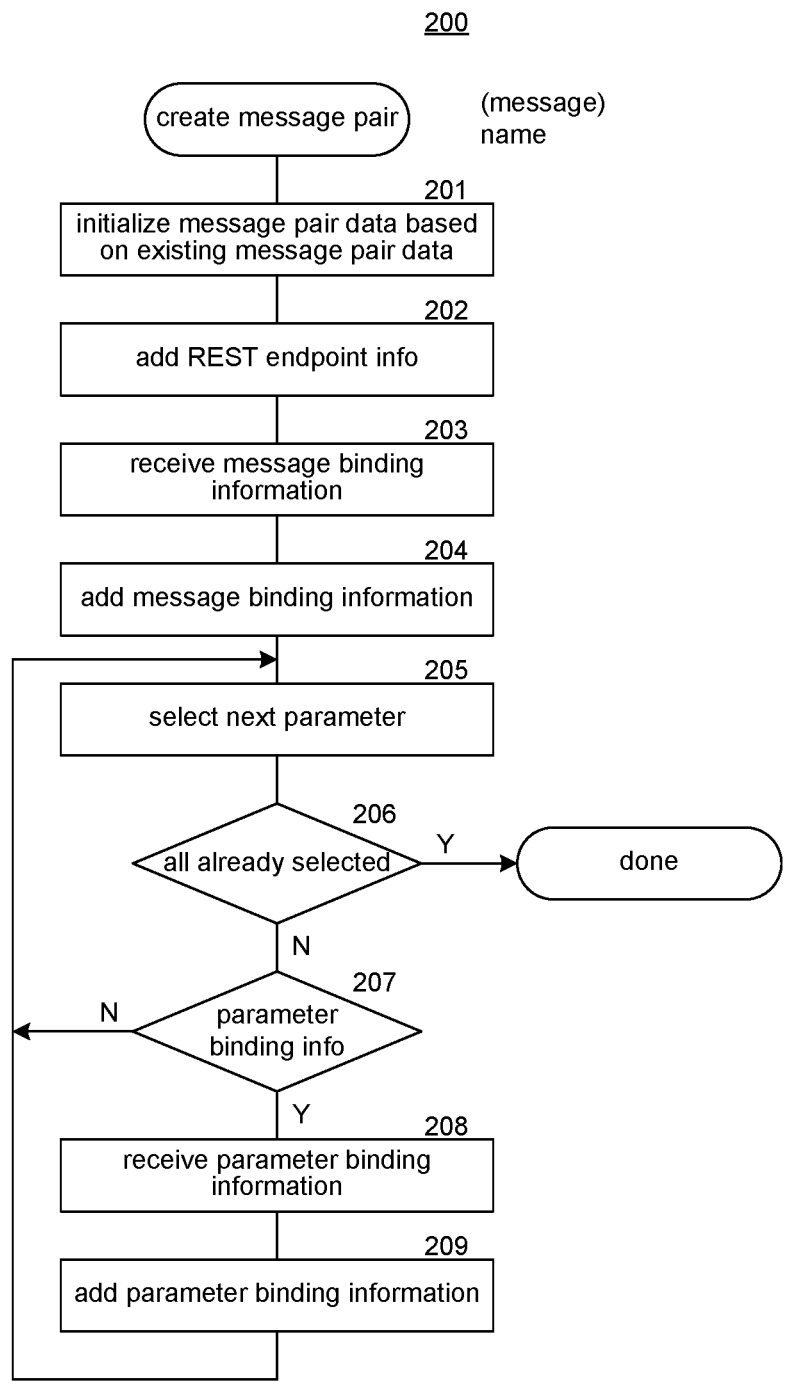
FIG. 2 is a flow diagram that illustrates processing of a create message pair component in some embodiments.

FIG. 2 is a flow diagram that illustrates processing of a create message pair component in some embodiments. A create message pair component 200 facilitates the creating of new message pair data for a REST endpoint based on existing message pair data for a SOAP endpoint. The component is passed the name of the message for which the new message pair data is to be created. In block 201, the component initializes the new message pair data for the message, for example, by copying the existing message pair data for the message to the new message pair data. In block 202, the component adds an endpoint tag or modifies an existing endpoint tag to indicate that the new message pair data is for the REST endpoint. In block 203, the component receives message binding information, if any, for the new message pair data. In block 204, if message binding information was received, then the component adds a message binding information tag to the new message pair data. In blocks 205-209, the component loops adding parameter binding information for the parameters of the new message pair data. In block 205, the component selects the next parameter of the operation as indicated by a field tag in the new message pair data. In decision block 206, if all the parameters have already been selected, then the component completes, else the component continues at block 207. In block 207, if parameter binding information is to be provided for the selected parameter, then the component continues at block 208, else the component loops to block 205 to select the next parameter. In block 208, the component receives the parameter binding information for the selected parameter. In block 209, the component adds a parameter binding information tag to the field tag for the selected parameter and then loops to block 205 to select the next parameter.

Figure 3:
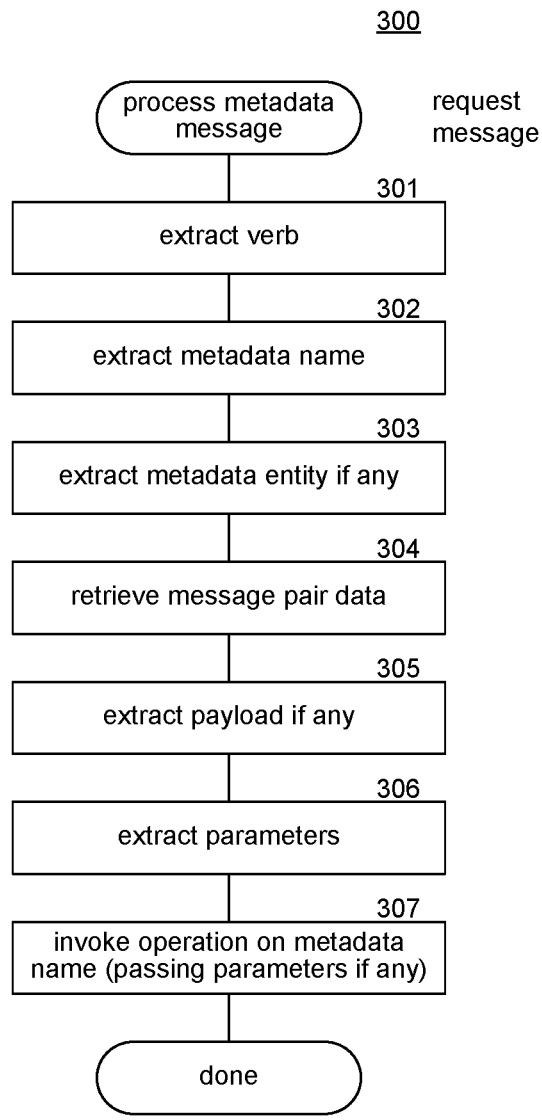
FIG. 3 is a flow diagram that illustrates processing of a process metadata message component in some embodiments.

FIG. 3 is a flow diagram that illustrates processing of a process metadata message component in some embodiments. A process metadata message component 300 is passed a request message that is for access metadata. In block 301, the component extracts the verb (e.g., GET) from the request message. In block 302, the component extracts the metadata name (e.g., Entity). In block 303, the component extracts an entity identifier (e.g., GUID), if any, from the request message. In block 304, the component retrieves the message pair data for the message corresponding to the extracted verb, entity name, and entity identifier. In block 305, the component extracts the payload, if any. In block 306, the component extracts the value, the parameters from the URI of the request message and from the payload as specified by the field tags of the message pair data. In block 307, the component invokes the operation specified by the message name of the message pair data passing the extracted parameters. Although not illustrated, the component also prepares a response message. The component then completes.

Figure 4:
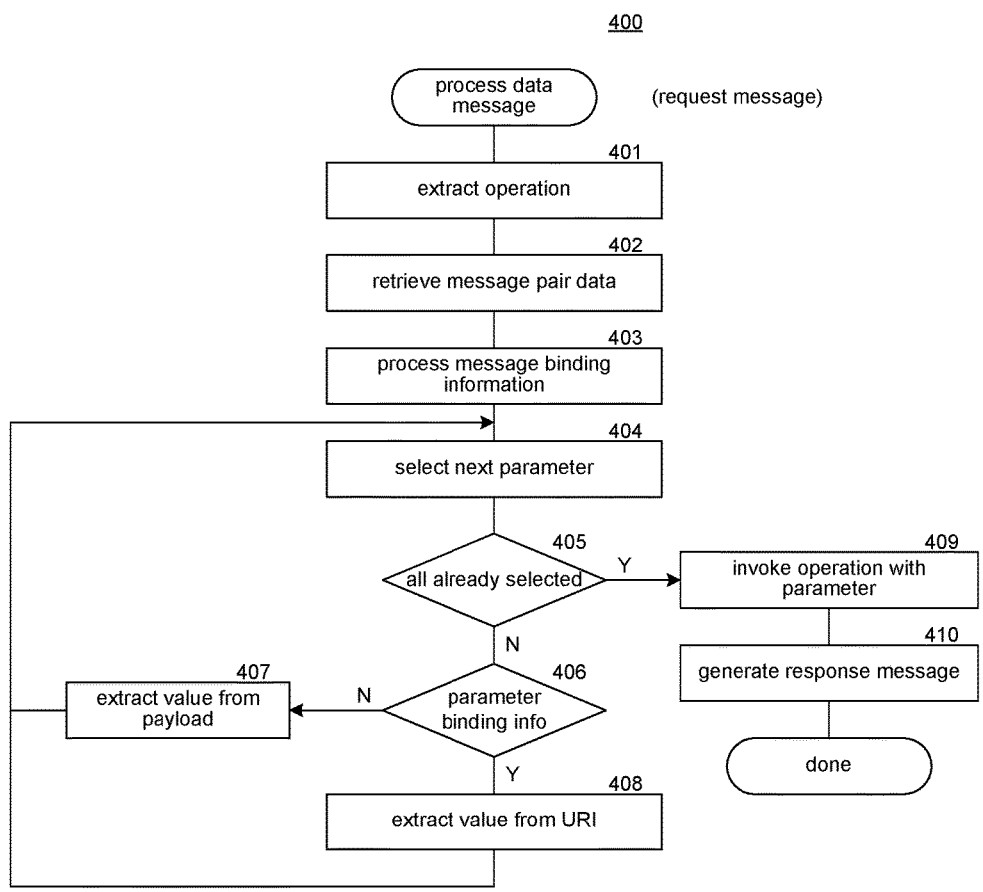
FIG. 4 is a flow diagram that illustrates the processing of a process data message component in some embodiments.

FIG. 4 is a flow diagram that illustrates the processing of a process data message component in some embodiments. A process data message component 400 is invoked to process a request message that accesses data of the database. In block 401, the component extracts the operation from the request message. In block 402, the component retrieves the message pair data for the REST endpoint. In block 403, the component extracts the message binding information, if any, from the message pair data. In blocks 404-408, the component loops extracting the value for each parameter. In block 404, the component selects the next parameter. In decision block 405, if all the parameters have already been selected, then the component continues at block 409, else the component continues at block 406. In decision block 406, if the field tag for the parameter includes a parameter binding information tag, then the component continues at block 408, else the component continues at block 407. In block 407, the component extracts the value for the parameter from the payload of the message and loops to block 404 to select the next parameter. In block 408, the component extracts the value from the URI and loops to block 404 to select the next parameter. The component also ensures that the values extracted from the URI are consistent with the message binding information and, if not, sends a response message indicating an error. In block 409, the component invokes the operation of the message pair data passing the extracted values as actual parameters. In block 410, the component generates a response message and completes.

The following paragraphs describe various embodiments of aspects of the endpoint system. An implementation of the endpoint system may employ any combination of the embodiments. The processing described below may be performed by a computing device with a processor that executes computer-executable instructions stored on a computer-readable storage medium that implements the endpoint system.

In some embodiments, a method performed by a computing device that provides a Representational State Transfer ("REST") endpoint for an application is provided. For each message to be processed by the REST endpoint, the method accesses message pair data for the message that includes an operation and parameter data. The parameter data includes parameter information for each parameter of the operation. The method receives a message at the REST endpoint that has a Uniform Resource Identifier ("URI") and a payload. The URI specifies an operation. For each parameter of the message pair data that matches the operation of the received message, the method performs the following. When the parameter information for the parameter includes parameter binding information, the method extracts a value for the parameter from the URI. When the parameter information for the parameter does not include parameter binding information, the method extracts a value for the parameter from the payload. Finally, the method invokes the operation of the retrieved messages passing one or more values for the one or more parameters of the operation. In some embodiments, the message pair data is generated based on existing message data pair for a message with the same operation for a different endpoint augmented with parameter binding information indicating that a parameter is bound to a URI of a message. In some embodiments, when the operation is on metadata, the message pair data for the message for that operation includes message binding information indicating that the message data pair is for an operation on metadata and a Hypertext Transfer Protocol ("HTTP") verb that matches the operation of the message pair data. In some embodiments, when the HTTP verb is POST and the URI does not identify a metadata entity, the method creates a metadata entity for the entity type based on attributes identified from the payload and headers. When the HTTP verb is PATCH and the URI identifies a metadata entity, the method updates metadata entity for the entity type based on attributes identified from the payload and headers. When the HTTP verb is GET, the method retrieves attributes for a metadata entity identified in the URI and query parameters. When the HTTP verb is DELETE, the method deletes the metadata entity identified in the URI. In some embodiments, when the operation is not on metadata, the message pair data for the message for that operation includes binding information indicating an entity type to which the operation is to be bound. In some embodiments, when the parameter binding information for a query parameter indicates that the parameter is bound to a query option of the URI, the method retrieves a value for the query parameter from the query option. In some embodiments, the parameter binding information for the parameter indicates the parameter of the operation to which the field of the message pair data is bound.

In some embodiments, a computing system for providing a Representational State Transfer ("REST") endpoint for an application is provided. The computing system comprises a message store, a computer-readable storage medium, and a processor that executes computer-executable instructions stored in the computer-readable storage medium. The message store stores, for each message, message pair data for the message based on existing message pair data for the message augmented with an indication that the message pair data is for the REST endpoint and with message binding information and parameter binding information. The existing message pair data specifies an operation and parameter information for one or more parameters for the operation. The computer-readable storage medium stores computer-executable instructions for controlling the computing system to receive a message at the REST endpoint, the message having a Uniform Resource Identifier ("URI") and a payload. The URI specifies an operation. The instructions further for controlling the computing system to retrieve the message pair data with an operation that matches the operation of the URI. The instructions further for controlling the computing system to when the URI specifies an entity type that matches the message binding information perform the following. For each parameter of the message pair data, when the parameter information for the parameter includes parameter binding information, retrieve a value for the parameter from the URI and when the parameter information for the parameter does not include parameter binding information, retrieve a value for the parameter from the payload. The instructions further for controlling the computing system to invoke the operation of the retrieved messages passing one or more parameters. In some embodiments, when the operation is on metadata, the message pair data for the message for that operation includes message binding information indicating that the message pair data is for an operation on metadata and a HyperText Transfer Protocol ("HTTP") verb that matches the operation of the message pair data. In some embodiments, the computer-executable instructions further include instructions that, when the parameter information for a query parameter includes parameter binding information, retrieve a value for the query parameter from a query option of the URI. In some embodiments, the parameter binding information indicates that parameter information for the parameter indicates the name of the parameter of the operation.

In some embodiments, a method performed by a computing device for generating augmented message pair data for a message for a Representational State Transfer ("REST")

endpoint is provided. The method retrieves message pair data for the message for an existing endpoint. The retrieved message pair data has parameter data for each parameter of the message and having an operation. The method stores the operation of the retrieved message pair data as the operation of the augmented message pair data. For each parameter of the retrieved message pair data, when the value of the parameter is stored in the payload of the message, the method stores the parameter data of the retrieved message pair data for the parameter as parameter data of the augmented message pair data for the parameter for the REST endpoint. For each parameter, when the value of the parameter is stored in the Uniform Resource Identifier ("URI") of a message, the method stores augmented parameter data as parameter data of the augmented message pair data for the parameter for the REST endpoint, the augmented parameter data including the parameter data of the retrieved message pair data for the parameter and an indication that the operation is bound to the parameter value of the URI. In some embodiments, the message pair data is in an eXtensible Markup Language ("XML") and the indication that the parameter is bound is a parameter binding information tag. In some embodiments, the method further stores as augmented message pair data an indication that the augmented message pair data supports the REST endpoint. In some embodiments, the message pair data is in an eXtensible Markup Language ("XML") and the indication that the augmented message pair data supports the REST endpoint is an endpoint tag. In some embodiments, when the message operates on metadata, the method stores in the augmented message pair an indication that the message is for a primitive operation and an indication of a HyperText Transfer Protocol ("HTTP") verb. In some embodiments, the message pair data is in an eXtensible Markup Language ("XML") and the indication that the message is for a primitive operation and the indication of a HTTP verb is a message binding information tag. In some embodiments, the parameter binding information indicates that the operation is bound to a query parameter that is a value in a query option portion of the URI.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for providing a Representational State Transfer ("REST") endpoint for an application, the method comprising:
for each message to be processed by the REST endpoint, accessing message pair data for the message that includes an operation and parameter data, the parameter data including parameter information for each parameter of the operation;
receiving a message at the REST endpoint, the message having a Uniform Resource Identifier ("URI") and a payload, the URI specifying an operation;
for each parameter of the message pair data that matches the operation of the received message,
when the parameter information for the parameter includes parameter binding information, extracting a value for the parameter from the URI;
when the parameter information for the parameter does not include parameter binding information, extracting a value for the parameter from the payload; and
invoking the operation of the retrieved messages passing one or more values for the one or more parameters of the operation.

2. The method of claim 1 wherein the message pair data is generated based on existing message data pair for a message with the same operation for a different endpoint augmented with parameter binding information indicating that a parameter is bound to a URI of a message.

3. The method of claim 1 wherein when the operation is on metadata, the message pair data for the message for that operation includes message binding information indicating that the message data pair is for an operation on metadata and a Hypertext Transfer Protocol ("HTTP") verb that matches the operation of the message pair data.

4. The method of claim 3 further comprising:
when the HTTP verb is POST and the URI does not identify a metadata entity, creating a metadata entity for the entity type based on attributes identified from the payload and headers;
when the HTTP verb is PATCH and the URI identifies a metadata entity, updating a metadata entity for the entity type based on attributes identified from the payload and headers;
when the HTTP verb is GET, retrieving attributes for a metadata entity identified in the URI and query parameters; and
when the HTTP verb is DELETE, deleting the metadata entity identified in the URI.

5. The method of claim 1 wherein when the operation is not on metadata, the message pair data for the message for that operation includes binding information indicating an entity type to which the operation is to be bound.

6. The method of claim 1 wherein when the parameter binding information for a query parameter indicates that the parameter is bound to a query option of the URI, retrieving a value for the query parameter from the query option.

7. The method of claim 1 wherein the parameter binding information for the parameter indicates the parameter of the operation to which the field of the message pair data is bound.

8. A computing system for providing a Representational State Transfer ("REST") endpoint for an application, comprising:
a message store storing, for each message, message pair data for the message based on existing message pair data for the message augmented with an indication that the message pair data is for the REST endpoint and with message binding information and parameter binding information, the existing message pair data specifying an operation and parameter information for one or more parameters for the operation;
a computer-readable storage medium storing computer-executable instructions for controlling the computing system to:
receive a message at the REST endpoint, the message having a Uniform Resource Identifier ("URI") and a payload, the URI specifying an operation;
retrieve the message pair data with an operation that matches the operation of the URI;

when the URI specifies an entity type that matches the message binding information,
for each parameter of the message pair data,
when the parameter information for the parameter includes parameter binding information, retrieve a value for the parameter from the URI; and
when the parameter information for the parameter does not include parameter binding information, retrieve a value for the parameter from the payload; and
invoke the operation of the retrieved messages passing one or more parameters; and
a processor that executes the computer-executable instructions stored in the computer-readable storage medium.

9. The computing system of claim 8 wherein when the operation is on metadata, the message pair data for the message for that operation includes message binding information indicating that the message pair data is for an operation on metadata and a HyperText Transfer Protocol ("HTTP") verb that matches the operation of the message pair data.

10. The computing system of claim 8 wherein the computer-executable instructions further include instructions that, when the parameter information for a query parameter includes parameter binding information, retrieve a value for the query parameter from a query option of the URI.

11. The computing system of claim 8 wherein the parameter binding information indicates that parameter information for the parameter indicates the name of the parameter of the operation.

12. A method performed by a computing device for generating augmented message pair data for a message for a Representational State Transfer ("REST") endpoint, the method comprising;
retrieving message pair data for the message for an existing endpoint, the retrieved message pair data having parameter data for each parameter of the message and having an operation;
storing the operation of the retrieved message pair data as the operation of the augmented message pair data; and
for each parameter of the retrieved message pair data,
when the value of the parameter is stored in the payload of the message, storing the parameter data of the retrieved message pair data for the parameter as parameter data of the augmented message pair data for the parameter for the REST endpoint; and
when the value of the parameter is stored in the Uniform Resource Identifier ("URI") of a message, storing augmented parameter data as parameter data of the augmented message pair data for the parameter for the REST endpoint, the augmented parameter data including the parameter data of the retrieved message pair data for the parameter and an indication that the operation is bound to the parameter value of the URI.

13. The method of claim 12 wherein the message pair data is in an eXtensible Markup Language ("XML") and the indication that the parameter is bound is a parameter binding information tag.

14. The method of claim 12 further comprising storing as augmented message pair data an indication that the augmented message pair data supports the REST endpoint.

15. The method of claim 14 wherein the message pair data is in an eXtensible Markup Language ("XML") and the indication that the augmented message pair data supports the REST endpoint is an endpoint tag.

16. The method of claim 12 further comprising when the message operates on metadata, storing in the augmented message pair an indication that the message is for a primitive operation and an indication of a HyperText Transfer Protocol ("HTTP") verb.

17. The method of claim 16 wherein the message pair data is in an eXtensible Markup Language ("XML") and the indication that the message is for a primitive operation and the indication of a HTTP verb is a message binding information tag.

18. The method of claim 12 wherein the parameter binding information indicates that the operation is bound to a query parameter that is a value in a query option portion of the URI.

* * * * *